B. C. BALL
TRACTION ENGINE.
APPLICATION FILED DEC. 15, 1911.
1,162,208.
Patented Nov. 30, 1915.
2 SHEETS—SHEET 1.
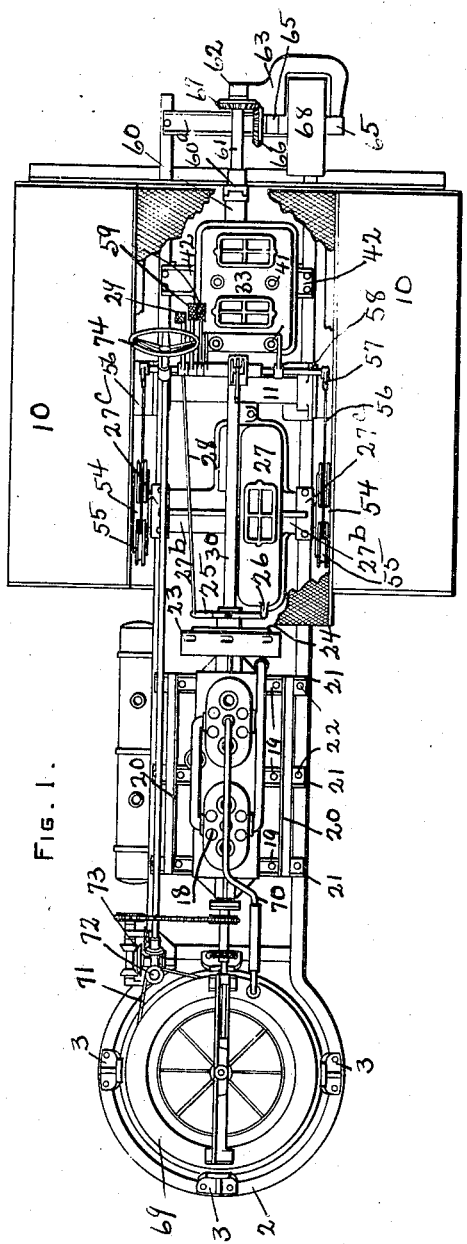
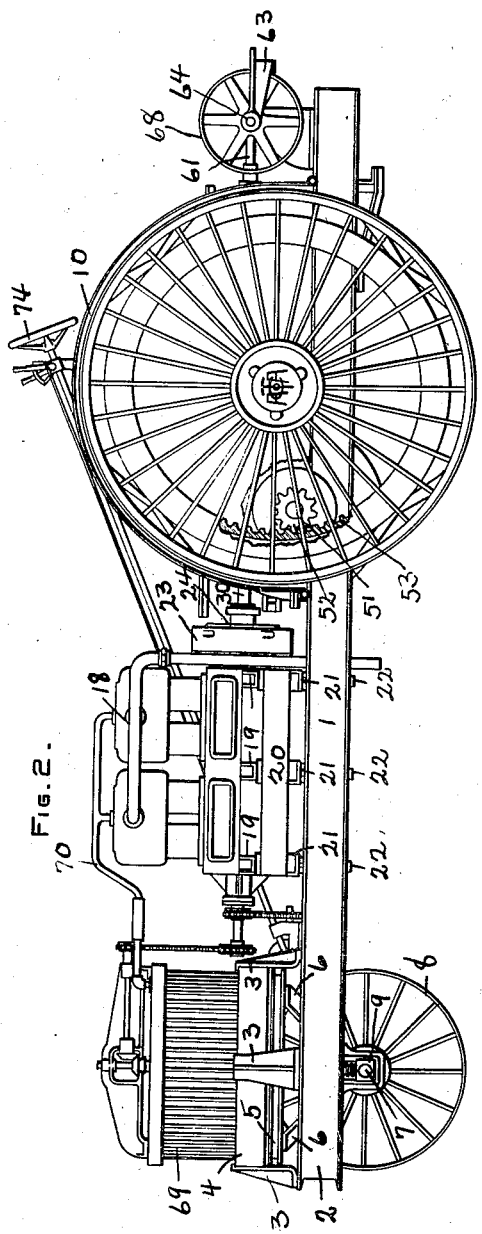
Witnesses
B. M. Hartman
Vinnie Hess
Inventor
Bert C. Ball
by his Attorney

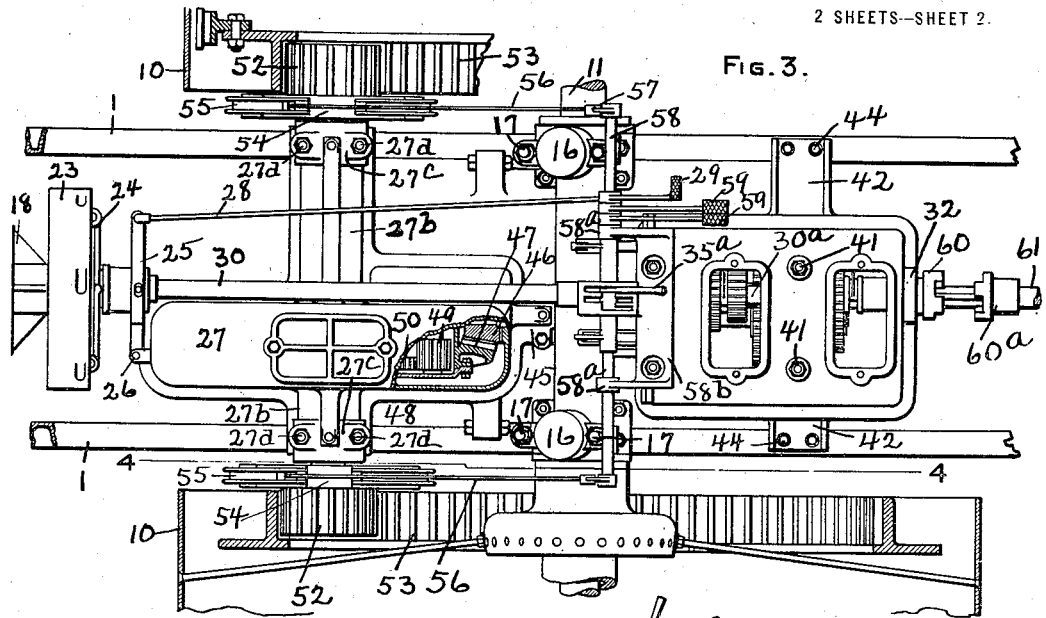

UNITED STATES PATENT OFFICE.

BERT C. BALL, OF PORTLAND, OREGON.

TRACTION-ENGINE.

1,162,208.

Specification of Letters Patent.   Patented Nov. 30, 1915.

Application filed December 15, 1911.   Serial No. 665,992.

*To all whom it may concern:*

Be it known that I, BERT C. BALL, a citizen of the United States, residing at Portland, in the county of Multnomah and State of Oregon, have invented new and useful Improvements in Traction-Engines, of which the following is a specification.

This invention relates to traction engines and consists in certain improvements in the construction thereof as will be hereinafter fully described and pointed out in the claims.

The invention is illustrated in the accompanying drawings as follows:—

Figure 1 shows a plan view of the engine. Fig. 2 a side elevation of the traction engine. Fig. 3 a plan view partly in section showing the driving connections between the motor and the traction wheels. Fig. 4 a section on the line 4—4 in Fig. 3. Fig. 5 a section on the line 5—5 in Fig. 4.

The frame has the sides 1 and front circle 2. Brackets 3 extend upwardly from the ring 2 and are secured to an annular mounting 4 for the steering frame 5. The steering frame 5 is rotatably mounted in the mounting 4. Brackets 6 extend downwardly from the frame 5. The axles 7 of the steering wheel 8 extend into bearing 9 carried by the brackets 6.

The traction wheels 10 are journaled on the axle 11. The axle 11 extends through the brackets 12 secured to the sides 1 of the frame. The brackets 12 are provided with the slots 13 in which the axle 11 is arranged. Blocks 14 are slidingly mounted in the slots 13 and rest on the axle. Springs 15 are arranged between the blocks 14 and the caps 16. The caps 16 are secured to the brackets 12 by the bolts 17. These springs form a spring mounting for the frame of the traction engine on the axle. At the same time, the movement of the axle relatively to the frame is controlled so as to maintain the traction wheel in proper relation to its driving gears hereinafter described.

The motor 18 which as shown is in the form of an explosive engine is mounted on a frame formed by the upper cross pieces 19, longitudinal cross pieces 20 and lower cross pieces 21. The lower cross pieces are bolted to the sides by means of the bolts 22.

The fly wheel 23 of the engine is utilized for one member of the clutch. The other member of the clutch 24 is fixed with relation to the shaft 30. The clutch is actuated by the lever 25 which is pivoted at 26 to the differential case 27. The rod 28 runs from the lever 25 to the foot lever 29.

The shaft 30 is connected with the driving shaft $30^a$ of the transmission mechanism. The shaft $30^a$ is journaled in the bearings 31 and 32 in the transmission case 33. The transmission gears 34 are arranged on the shaft $30^a$ and are adapted to be thrown into mesh with the gears 35 on the driven transmission shaft 36. These transmission gears operate in the ordinary manner and are thrown into and out of mesh by the lever $35^a$. The lever $35^a$ is pivoted on a shaft 58 extending across the frame and carried by bearings $58^a$ on a bracket $58^b$ secured to the transmission case 33. The shaft 36 is journaled in the bearings 37 and 38 in the case 33.

It will be noted that the transmission case is parted at 39 and 40, the parting passing through the centers of the bearings 31, 32, 37 and 38. In this manner, the parts of the case form the separable parts of these bearings so that the bolts 41 which extend entirely through the transmission case not only secure all the parts of the transmission case but also the parts of the bearings formed with the case.

The lower member of the transmission case has the arms 42 which extend across the frame, the arms being provided with the lips 43 which rest on the sides 1 of the frame. Bolts 44 extend through the lips 43, the flanges of the channel iron forming the sides so as to secure the arms 42 to the frame. These arms with the transmission case form in this way a member of the frame.

The driven transmission shaft 36 extends through the bearing 45 in the differential case 27. A beveled gear 46 on the end of the shaft 36 meshes a beveled gear 47 secured to the frame of the differential gear. The differential gear may be of any type. As shown, it is of the spur gear type having the floating gear 49 and fixed gear 50. The gears 50 are fixed on the cross shafts 51. Gears 52 are fixed on the ends of the cross shafts 51 and mesh the gears 53 on the traction wheels. The shafts 51 are journaled in the bearings $27^c$ arranged on the differential case.

The differential case has the arms or extensions $27^b$ which form a part of the case and extend from side to side of the frame. Shafts 51 are arranged in these arms. Bolts $27^d$ extend through these arms and through the flanges forming the channel iron of the sides. It will be noted that the differential case is parted at 27ª which parting extends through the bearings 27ᶜ and bearing 45. In this manner it is practical to make these different bearings directly in the case. Simply bolting the arms 27ᵇ to the sides of the frame by the bolts 27ᵈ secures not only the parts of the differential case but also the parts of the bearings.

Brake wheels 54 are fixed on the shafts 51. These are operated by the brake bands 55. The brake bands 55 are connected by the rods 56 with the rock arms 57 fixed on the shafts 58. The foot levers 59 are also fixed on the shafts 58 and in close proximity to each other, the shafts 58 being separated between said levers. By placing the foot on both levers at once, both brakes may be set, or by operating either lever 59, the brakes may be set independently of each other. This is useful in assisting in the steering of the vehicle in difficult places and also where one or the other of the traction wheels by reason of the ground on which the engine is working has little or no traction.

A clutch member 60 is fixed on the end of the driving transmission shaft 30ª and extends outside of the differential case 33. A shaft 61 is carried by the member 60 and the bearing 62. The bearing 62 is mounted on the bracket 63. The bracket 63 is secured on the ends of the sides of the frame. A cross shaft 64 is journaled in the bearings 65 also carried by the bracket 63. A beveled gear 66 is fixed on the shaft 64 and meshes a beveled gear 67 on the shaft 61. A belt pulley 68 is fixed on the shaft 64. A clutch member 60ª is slidingly mounted on the shaft 61 and locked against rotation thereon by a spline and groove mechanism. The clutch is thrown out of engagement in Fig. 3 and in engagement in Fig. 1. By throwing in this clutch, the belt pulley 68 is actuated so that the engine may be used for power purposes.

A radiator 69 extends upwardly from the mounting 4. This radiator is connected by the pipe 70 with the water system of the motor.

A steering cable 71 extends around the steering frame 5. It is secured to the shaft 72. A steering gear 73 shown in detail in Figs. 1 and 2 is arranged to actuate the shaft 72. A steering wheel 74 extends to the gear 73 by means of which the engine may be steered.

It is preferable for convenience of mounting and balancing the engine to place the motor in front of the traction wheels. The present arrangement with the transmission gear at the rear of the axle gives ample opportunity for a desirable length of shaft between the motor and the transmission gear and places this mechanism in convenient position for throwing the gears. It is also preferable to have the gears operating on the traction wheels in front of the axle in that the thrust of the gears tends to lift the frame and thus decreases the friction on the axle bearing. This construction provides a convenient way of so placing the gears operating upon the traction wheels in that the differential may be placed in front of the axle and readily connected with the transmission at the rear of the axle. This arrangement also permits of the placing of the operating mechanism all above the main frame so that the different parts may be readily accessible.

What I claim as new is:—

1. In a traction engine, the combination of a frame; traction wheels; an axle mounted on the frame on which the wheels are mounted; a motor mounted on the frame; transmission gearing carried by the frame at the opposite side of the axle from the motor; a driven shaft extending from the motor to the transmission gearing; a differential gear at the opposite side of the axle from the transmission gearing; a driven transmission shaft connecting the transmission gearing with the differential gear, said driving shaft and driven transmission shaft being arranged on opposite sides of the axle; and a driving connection between the differential gear and the traction wheels.

2. In a traction engine, the combination of a frame; traction wheels; an axle on which the wheels are mounted; a spring connection between the axle and the frame; a motor mounted on the frame; transmission gearing carried by the frame and arranged at the opposite side of the axle from the motor; a driving shaft connecting the motor and transmission gearing and arranged above the axle a sufficient distance to allow a movement of the axle with the yielding of the spring connection; a differential gear; a shaft connecting the differential gear and transmission gearing and arranged below the axle; and a driving connection between the differential gear and the traction wheels.

In testimony whereof I have hereunto set my hand in the presence of two subscribing witnesses.

BERT C. BALL.

Witnesses:
H. T. HUMPHREY,
H. V. CARPENTER.